United States Patent
Wanat et al.

(10) Patent No.: US 10,140,953 B2
(45) Date of Patent: Nov. 27, 2018

(54) AMBIENT-LIGHT-CORRECTED DISPLAY MANAGEMENT FOR HIGH DYNAMIC RANGE IMAGES

(71) Applicant: Dolby Laboratories Licensing Corporation, San Francisco, CA (US)

(72) Inventors: Robert Wanat, Sunnyvale, CA (US); Robin Atkins, Campbell, CA (US); Scott Daly, Kalama, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 145 days.

(21) Appl. No.: 15/298,521

(22) Filed: Oct. 20, 2016

(65) Prior Publication Data
US 2017/0116963 A1    Apr. 27, 2017

Related U.S. Application Data

(60) Provisional application No. 62/245,023, filed on Oct. 22, 2015.

(51) Int. Cl.
*G09G 5/10* (2006.01)
*G09G 5/02* (2006.01)
(Continued)

(52) U.S. Cl.
CPC ............ *G09G 5/10* (2013.01); *G06T 5/009* (2013.01); *G06T 7/90* (2017.01);
(Continued)

(58) Field of Classification Search
CPC combination set(s) only.
See application file for complete search history.

(56) References Cited

U.S. PATENT DOCUMENTS 8,704,859 B2    4/2014  Greenebaum
9,077,994 B2    7/2015  Miller
(Continued)

FOREIGN PATENT DOCUMENTS

JP    2013-162513    8/2013
KR    10-1070057     10/2011
(Continued)

OTHER PUBLICATIONS

SMPTE Standard 2084:2014 "High Dynamic Range Electro-Optical Transfer Function of Mastering Reference Displays" Aug. 29, 2014, pp. 1-14.

(Continued)

*Primary Examiner* — Wesner Sajous (57) ABSTRACT

Methods are disclosed for adaptive display management using one or more viewing environment parameters. Given the one or more viewing environment parameters, an effective luminance range for a target display, and an input image, a tone-mapped image is generated based on a tone-mapping curve, an original PQ luminance mapping function, and the effective luminance range of the display. A corrected PQ (PQ') luminance mapping function is generated according to the viewing environment parameters. A PQ-to-PQ' mapping is generated, wherein codewords in the original PQ luminance mapping function are mapped to codewords in the corrected (PQ') luminance mapping function, and an adjusted tone-mapped image is generated based on the PQ-to-PQ' mapping.

14 Claims, 4 Drawing Sheets

(51) Int. Cl.
*G06T 7/90* (2017.01)
*G06T 5/00* (2006.01)
*G06T 11/00* (2006.01)
*G06T 3/40* (2006.01)
*G06T 7/40* (2017.01)
*H04N 1/60* (2006.01)
*H04N 5/58* (2006.01)
*H04N 5/57* (2006.01)
*H04N 9/73* (2006.01)

(52) U.S. Cl.
CPC .............. *G06T 2207/20208* (2013.01); *G09G 2320/0233* (2013.01); *G09G 2360/144* (2013.01)

(56) References Cited

U.S. PATENT DOCUMENTS

| | | |
|---|---|---|
| 2006/0284895 A1 | 12/2006 | Marcu |
| 2012/0051635 A1* | 3/2012 | Kunkel .................. G06T 5/009 382/165 |
| 2014/0210847 A1* | 7/2014 | Knibbeler .............. G09G 5/006 345/589 |
| 2015/0070337 A1 | 3/2015 | Bell |
| 2016/0359584 A1* | 12/2016 | Yang .................. H04L 27/2613 |
| 2017/0116931 A1* | 4/2017 | Matsui .................... G09G 3/36 |
| 2018/0013927 A1* | 1/2018 | Atkins ................. H04N 1/6058 |
| 2018/0068637 A1* | 3/2018 | Ninan ...................... G09G 5/10 |

FOREIGN PATENT DOCUMENTS

| | | |
|---|---|---|
| KR | 10-1357164 | 2/2014 |
| WO | 2007/018969 | 2/2007 |
| WO | 2014/130343 | 8/2014 |
| WO | 2016/118395 | 7/2016 |

OTHER PUBLICATIONS

ITU-R BT.1886 "Reference Electro-Optical Transfer Function for Flat Panel Displays Used in HDTV Studio Production" BT Series, Mar. 2011, pp. 1-7.

Ebner, F. et al "Development and Testing of a Color Space (ipt) with Improved Hue Uniformity", Proc. 6th Color Imaging Conference: Color Science, Systems, and Applications, IS&T, Scottsdale, Arizona, Nov. 1998, pp. 8-13.

Froehlich, J. et al "Encoding Color Difference Signals for High Dynamic Range and Wide Gamut Imagery" Color and Imaging Conference, vol. 2015, No. 1, Oct. 2015, pp. 240-247, Society for Image Science and Technology.

Barten, Peter G.J. "Formula for the Contrast Sensitivity of the Human Eye" edited by Y. Miyake and D.R. Rasmussen, Proc. of SPIE-IS&T Electronic Imaging, SPIE vol. 5294, 2004, pp. 231-238.

Bartleson, C.J. et al "Brightness Perception in Complex Fields" Journal of the Optical Society of America, vol. 57, No. 7, Jul. 1967, pp. 953-957.

ITU British Broadcasting Corporation "Parameter Values for Extended Image Dynamic Range Television Systems for Production and International Programme Exchange" Jul. 3, 2015, pp. 1-15.

Rogers, J.G. et al "Development of Design Criteria for Sensor Displays" May-Dec. 1973, pp. 1-127.

\* cited by examiner

AMBIENT-LIGHT-CORRECTED DISPLAY MANAGEMENT FOR HIGH DYNAMIC RANGE IMAGES

CROSS-REFERENCE TO RELATED APPLICATIONS

This application claims the benefit of priority to U.S. Provisional Patent Application Ser. No. 62/245,023, filed on Oct. 22, 2015, which is hereby incorporated herein by reference in its entirety.

TECHNOLOGY

The present invention relates generally to images. More particularly, an embodiment of the present invention relates to ambient-light-corrected display management for high dynamic range (HDR) images.

BACKGROUND

As used herein, the terms "display management" or "display mapping" denote the processing (e.g., tone and gamut mapping) required to map an input video signal of a first dynamic range (e.g., 1000 nits) to a display of a second dynamic range (e.g., 500 nits). Examples of display management processes can be found in WIPO Publication Ser. No. WO2014/130343 (to be referred to as the '343 publication), "Display Management for High Dynamic Range Video," and U.S. Provisional Application Ser. No. 62/105,139, (to be referred as the '139 Application), filed on Jan. 19, 2015, each of which is incorporated herein by reference in its entirety.

As used herein, the term 'dynamic range' (DR) may relate to a capability of the human visual system (HVS) to perceive a range of light intensity (e.g., luminance, luma) in an image, e.g., from darkest blacks (darks) to brightest whites (highlights). In this sense, DR relates to a 'scene-referred' light intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g., interchangeably.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March/2011), which is incorporated herein by reference in its entity, defines the reference EOTF for flat panel displays based on measured characteristics of the Cathode Ray Tube (CRT). Given a video stream, any ancillary information is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer HDTVs range from 300 to 500 nits peak luminance with new models reaching 1000 nits (cd/m$^2$). As the availability of HDR content grows due to advances in both capture equipment (e.g., cameras) and displays (e.g., the PRM-4200 professional reference monitor from Dolby Laboratories), HDR content may be color graded and displayed on displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure were designed primarily for any dynamic range higher than SDR. However, the general methods could be applied to dynamic ranges lower than SDR, such as would occur with either high ambient or lower dynamic range displays, and still result in improvement over doing no compensation. As appreciated by the inventors here, improved techniques for the display of high-dynamic range images, especially as they relate to a changing viewing environment, are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Techniques for ambient-light-corrected display management or mapping of high dynamic range (HDR) images are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the display management of HDR images under changing viewing environments (e.g., a change of the viewing ambient light). Given: one or more viewing environment parameters, an effective luminance dynamic range for a target display, and an input image, then a tone-mapped image is generated based on a tone-mapping curve, an original PQ luminance mapping function, and the effective luminance dynamic range of the display. A corrected PQ (PQ') luminance mapping function is generated according to the viewing environment parameters. A PQ-to-PQ' mapping is generated, wherein codewords in the original PQ luminance mapping function are mapped to codewords in the corrected (PQ') luminance mapping function, and an adjusted tone-mapped image is generated based on the PQ-to-PQ' mapping.

Example Display Control and Display Management

Figure 1:
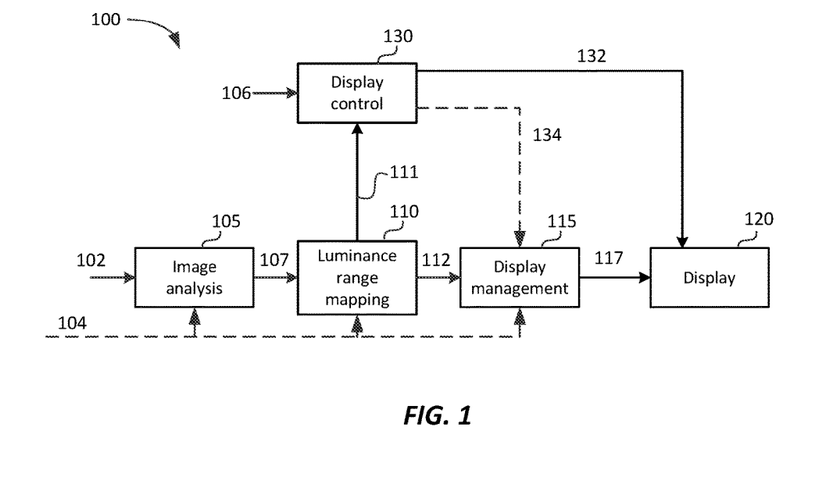
FIG. 1 depicts an example process for backlight control and display management according to an embodiment of this invention.

FIG. 1 depicts an example process (100) for display control and display management according to an embodiment. Input signal (102) is to be displayed on display (120). Input signal may represent a single image frame, a collection of images, or a video signal. Image signal (102) represents a desired image on some source display typically defined by a signal EOTF, such as ITU-R BT. 1886 or SMPTE ST 2084, which describes the relationship between color values (e.g., luminance) of the input video signal to output screen color values (e.g., screen luminance) produced by the target display (120). The display may be a movie projector, a television set, a monitor, and the like, or may be part of another device, such as a tablet or a smart phone.

Process (100) may be part of the functionality of a receiver or media player connected to a display (e.g., a cinema projector, a television set, a set-top box, a tablet, a smart-phone, a gaming console, and the like), where content is consumed, or it may be part of a content-creation system, where, for example, input (102) is mapped from one color grade and dynamic range to a target dynamic range suitable for a target family of displays (e.g., televisions with standard or high dynamic range, movie theater projectors, and the like).

In some embodiments, input signal (102) may also include metadata (104). These can be signal metadata, characterizing properties of the signal itself, or source metadata, characterizing properties of the environment used to color grade and process the input signal (e.g., source display properties, ambient light, coding metadata, and the like).

In some embodiments (e.g., during content creation), process (100) may also generate metadata which are embedded into the generated tone-mapped output signal. A target display (120) may have a different EOTF than the source display. A receiver needs to account for the EOTF differences between the source and target displays to accurate display the input image, so that it is perceived as the best match possible to the source image displayed on the source display. In an embodiment, image analysis (105) block may compute characteristics of the input signal (102), such as its minimum (min), average (mid), and peak (max) luminance values, to be used in the rest of the processing pipeline. For example, given min, mid, and max luminance source data (107 or 104), image processing block (110) may compute the display parameters (e.g., the preferred backlight level for display (120)) that will allow for the best possible environment for displaying the input video. Display management (115) is the process that maps the input image into the target display (120) by taking into account the two EOTFs as well as the fact that the source and target displays may have different capabilities (e.g., in terms of dynamic range.)

In some embodiments, the dynamic range of the input (102) may be lower than the dynamic range of the display (120). For example, an input with maximum luminance of 100 nits in a Rec. 709 format may need to be color graded and displayed on a display with maximum luminance of 1,000 nits. In other embodiments, the dynamic range of input (102) may be the same or higher than the dynamic range of the display. For example, input (102) may be color graded at a maximum luminance of 5,000 nits while the target display (120) may have a maximum luminance of 1,500 nits.

In an embodiment, display (120) is controlled by display controller (130). Display controller (130) provides display-related data (134) to the display mapping process (115) (such as: minimum and maximum luminance of the display, color gamut information, and the like) and control data (132) for the display, such as control signals to modulate the backlight or other parameters of the display for either global or local dimming.

In an embodiment, display controller (130) may receive information (106) about the viewing environment, such as the intensity of the ambient light. This information can be derived from measurements from one or more sensors attached to the device, user input, location data, default values, or other data. For example, even without a sensor, a user could select a viewing environment from a menu, such as "Dark", "Normal", "Bright," and "Very bright," where each entry in the menu is associated with a predefined luminance value selected by the device manufacturer. Signal 106 may also include estimates of the screen reflections in the viewing environment. Such estimates may be derived from a model of the screen reflectivity of the display (120) and measurements of the ambient light in the viewing environment. Typically, sensors are in the front of the display, and measure the illumination on the display screen, which is the ambient component that elevates the black level as a function of reflectivity. Viewing environment information (106) may also be communicated to display management unit (115) via interface 134.

Displays using global or local backlight modulation techniques adjust the backlight based on information from input frames of the image content and/or information received by local ambient light sensors. For example, for relatively dark images, the display controller (130) may dim the backlight of the display to enhance the blacks. Similarly, for relatively bright images, the display controller may increase the backlight of the display to enhance the highlights of the image, as well as elevate the dark region luminances since they would fall below threshold contrasts for a high ambient environment.

Figure 2:
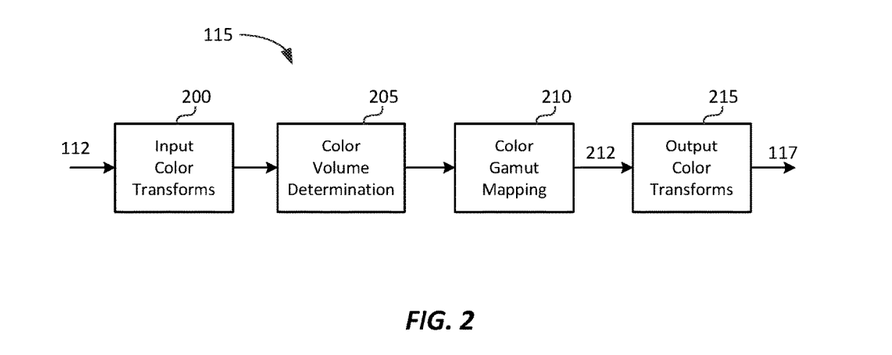
FIG. 2 depicts an example process for display management according to an embodiment of this invention.

As described in WO2014/130343, and depicted in FIG. 2, given an input (112), the display characteristics of a target display (120), and metadata (104), the display management process (115) may be sub-divided into the following main steps:

a) Step (200)—Optional input color conversions, say from RGB or YCbCr to IPT-PQ
b) Step (205)—Determining the optimum color volume for the target display, including tone mapping and saturation adjustments
c) Step (210)—Performing the optimum color gamut mapping (CGM) for the target display
d) Step (215)—Output color transforms (say, from IPT-PQ to whatever color format is needed for the target display or other post-processing)

As used herein, the term "color volume space" denotes the 3D volume of colors that can be represented in a video signal and/or can be represented in display. Thus, a color volume space characterizes both luminance and color/chroma characteristics. For example, a first color volume "A" may be characterized by: 400 nits of peak luminance, 0.4 nits of minimum luminance, and Rec. 709 color primaries. Similarly, a second color volume "B" may be characterized by: 4,000 nits of peak luminance, 0.1 nits of minimum luminance, and Rec. 709 primaries.

In an embodiment, as noted earlier, color volume determination (205) may include the following steps:

a) applying a tone curve to remap the intensity channel (I) of the input video according to the display characteristics of the target display, and b) applying a saturation adjustment to the tone-curve mapping step to account for the adjustments in the intensity channel. The saturation adjustment may be dependent on the luminance level of the pixel or its surrounding region.

The initial color volume determination (205) may result in colors outside of the target display gamut. During color gamut mapping (210), a 3D color gamut look-up table (LUT) may be computed and applied to adjust the color gamut so that out of gamut pixels are brought inside or closer to the color volume of the target display. In some embodiments, an optional color transformation step (215) may also be used to translate the output of CGM (212) (say, RGB) to a color representation suitable for display or additional processing (say, YCbCr), according to the display's EOTF.

As mentioned earlier, in a preferred embodiment, color volume determination may be performed in the IPT-PQ color space. The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system than traditional gamma functions. An example of a PQ mapping function is described in the SMPTE ST 2084 specification, where given a fixed stimulus size, for every luminance level (i.e., the stimulus level), a minimum visible contrast step at that luminance level is selected according to the most sensitive adaptation level and the most sensitive spatial frequency (according to HVS Contrast Sensitivity Function (CSF) models, which are analogous to spatial MTFs). Compared to the traditional gamma curve, which represents the response curve of a physical cathode ray tube (CRT) device and coincidentally may have a very rough similarity to the way the human visual system responds but only for limited dynamic ranges of less than 2 log 10 units, a PQ curve imitates the true visual response of the human visual system using a relatively simple functional model. Further, it more accurate over a much larger dynamic range.

The IPT-PQ color space, as also described in the '343 publication, combines a PQ mapping with the IPT color space as described in "Development and testing of a color space (ipt) with improved hue uniformity," Proc. 6$^{th}$ Color Imaging Conference: Color Science, Systems, and Applications, IS&T, Scottsdale, Ariz., November 1998, pp. 8-13, by F. Ebner and M. D. Fairchild, which is incorporated herein by reference in its entirety. IPT is like the YCbCr or CIE-Lab color spaces; however, it has been shown in some scientific studies to better mimic human visual processing than these spaces, because the I is a better model of spatial vision than the Y, or L* used in these other models. An example of such a study is the work by J. Froehlich et al. "*Encoding color difference signals for high dynamic range and wide gamut imagery*," Color and Imaging Conference, Vol. 2015, No. 1, October 2015, pp. 240-247(8), Society for Image Science and Technology.

The display management process (115), which typically does not use signal 106, works well under the assumption of a reference dim viewing environment. Since many viewers watch content in a non-reference viewing environment, as appreciated by the inventors, it would be desirable to adjust the display management process according to changes in the viewing conditions.

In an embodiment, two additional steps may be incorporated to the steps described earlier:

a) during color volume determination (205), applying a tone curve to remap the intensity channel to account for the difference between a reference dark viewing environment and the actual viewing environment; and b) before the output color transformations (215), taking into consideration and subtracting the estimated reflected light from the screen.

Each of these steps is discussed in more detail next.

Ambient-Light-Corrected Perceptual Quantization

The PQ mapping function adopted in the SMPTE ST 2084 specification is based on work done by J. S. Miller et al., as presented in U.S. Pat. No. 9,077,994 "Device and method of improving the perceptual luminance nonlinearity-based image data exchange across different display capabilities," which is incorporated herein by reference in its entirety. That mapping function was derived for a viewing environment with minimal ambient surround light, such as a completely dark room. Hence, it is desirable to compute alternative PQ mapping functions, to be referred to as PQ', by taking into consideration the viewing conditions, and in particular, the intensity of the ambient light. For example, taking into consideration the ambient light ensures that details in the dark areas of the image do not become uniformly black when the scene is viewed in a brighter environment. Following the same approach as Miller et al., the steps of a PQ' mapping may be derived iteratively. In an embodiment, for $L_o$ at about $10^{-6}$ nits, $$L_{k+1} = L_k * \left( \frac{1 + 0.9 * m_t}{1 - 0.9 * m_t} \right), \tag{1}$$

where $L_k$ denotes the k-th step and $m_t$ denotes a detection threshold, which is the lowest increase of luminance an average human can detect at luminance $L_k$. Multiplying $m_t$ by 0.9 ensures the increment will not be visible. In an embodiment, $m_t$ is determined as a function of a contrast sensitivity function (S(L)) at the spatial frequency where the sensitivity is the highest for luminance L and an ambient-light factor ($A(L_a)$) at ambient (surround) luminance $L_a$, as $$m_t(L, L_a) = \frac{1}{S(L) * A(L_a)}. \tag{2}$$

Without limitation, examples of S(L) and $A(L_a)$ functions are presented by P. G. J. Barten, "*Formula for the contrast sensitivity of the human eye*," in Image quality and system performance, edited by Y. Miyake and D. R. Rasmussen, Proc. Of SPIE-IS&T Electronic Imaging, SPIE Vol. 5294, 2004, pp. 231-238, (e.g., see equations 11 and 13), which is incorporated herein by reference in its entirety.

Figure 3:
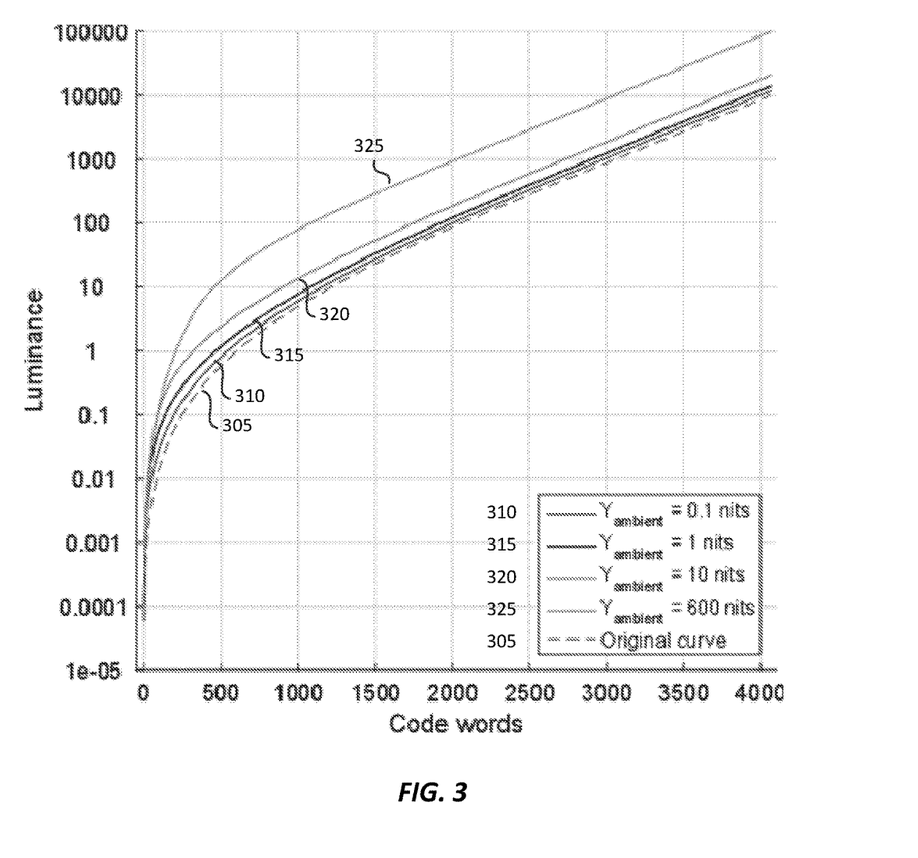
FIG. 3 depicts examples of ambient-light-corrected perceptual quantization curves computed according to an embodiment of this invention.

Examples of PQ' curves (310, 315, 320, 325) computed at various levels of ambient light ranging from 0.1 to 600 nits, for a 12-bit input, are shown in FIG. 3. The original PQ curve (305) is also depicted. The ambient-light-corrected curves generally require a higher dynamic range to offer the same number of distinct code words as the original PQ curve.

PQ to PQ' Mapping Adjustment

Figure 4:
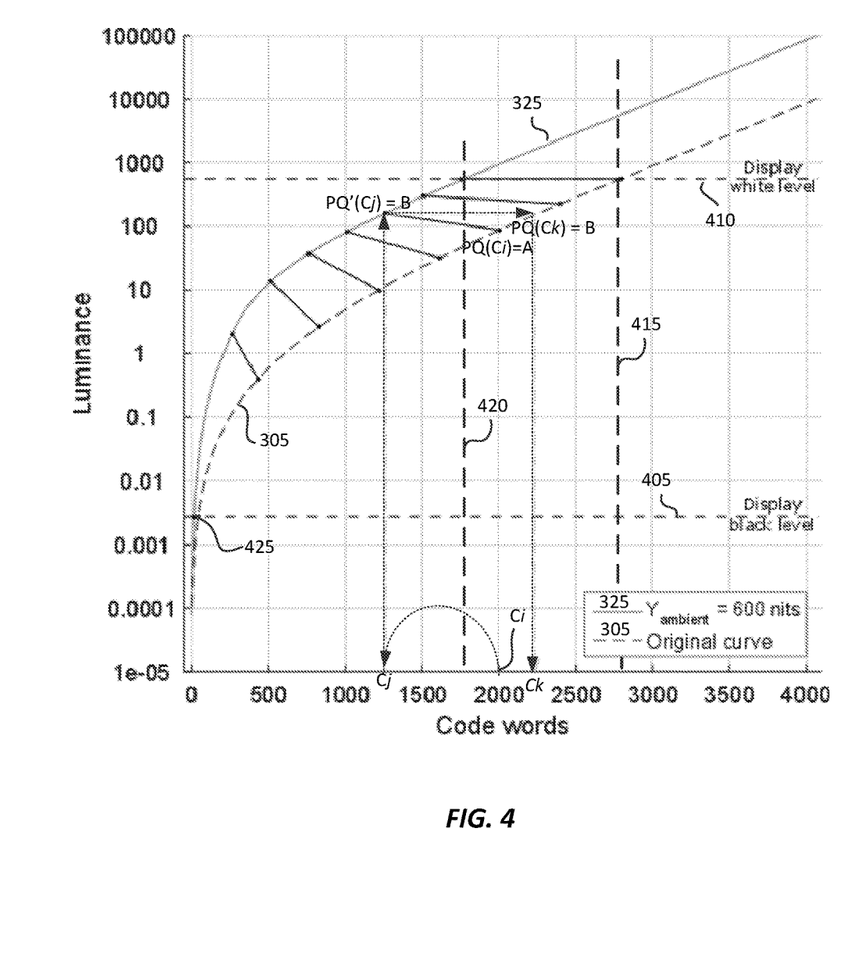
FIG. 4 depicts an example of PQ to PQ' mapping for a given ambient light and display characteristics according to an embodiment of this invention.

As discussed earlier, in an embodiment, the display management process (115) is performed in the IPT-PQ domain. Incoming signals (say RGB in BT1866), before any processing, are de-linearized and converter to IPT-PQ (e.g., in 200). Then, as part of color volume determination (e.g., in 205), the intensity component of the input (say, $I_{in}$) is remapped to new intensity values (say, $I_{out}$) according to the characteristics of the target display, such as, its minimum and maximum luminance (405 and 410). The input color transformation (say, from RGB to IPT) assumes an original PQ curve (305) computed under the assumption of a dark environment. As an example, FIG. 4 depicts the original PQ curve for 12 bits. It also depicts the minimum and maximum luminance levels of a target display, to be denoted as TMin (405) and TMax (410).

As can be seen in FIG. 4, given TMin and TMax, only a part of the available code words will be used, say from CMin (425) to CMax (415), where PQ(CMin)=TMin and PQ(CMax)=TMax. The goal of a PQ to PQ' mapping adjustment is to map incoming intensity (I) values to new intensity values (I') by taking into consideration both the ambient light and the luminance characteristics of the target display Consider now, as an example, an ambient light causing surround luminances measured, without limitation, at La nits (e.g., La=600). As depicted in FIG. 4, the PQ'$_{La}$ mapping function (325) for La=600 nits, representing the ambient-light-adjusted PQ mapping, typically allows a different number of code words to be used, say from CMin' (not shown for clarity) to CMax' (420), where PQ'$_{La}$(CMin')=TMin and PQ'$_{La}$(CMax')=TMax.

In an embodiment, to preserve the appearance of the original image viewed at a different ambient light, the first step in the PQ to PQ' mapping is to map values of the original curve (say, PQ(Ci), for Ci=CMin to CMax) to corresponding values in the adjusted curve (say, PQ'$_{La}$(Cj), for Cj=CMin' to CMax'). As an example, as depicted in FIG. 4, at about Ci=2,000, PQ(Ci)=A is mapped to PQ'$_{La}$(Cj)=B. In an embodiment, this mapping is performed by preserving image contrast, as measured in units of JNDs, in terms of the position of the original intensity value relatively to the total number of PQ steps offered by the display. That is, if a codeword (Ci) lies at say 1/n of the full PQ range (CMin to CMax), the corresponding codeword (Cj) in PQ' should also lie at 1/n of the full PQ' range (CMin' to CMax'). Assuming, with no limitation, a linear interpolation mapping, this can be expressed as:

$$\frac{CMax - Ci}{CMax - CMin} = \frac{CMax' - Cj}{CMax' - CMin'}, \quad (3)$$

or $$Cj = \left\lfloor CMax' - (CMax' - CMin') * \frac{CMax - Ci}{CMax - CMin} \right\rfloor.$$

This provides a similar proportional placement of the code values in each of the ranges resulting from the different ambient conditions. In other embodiments, other linear or non-linear mappings may also be employed.

For example, given approximate values extracted from FIG. 4, say CMax=2,850, CMin=62, CMax'=1800, and CMin'=40, for Ci=2,000, from equation (3), Cj=1,263. In summary, given an input codeword I=Ci mapped according to PQ(Ci), its luminance should be adjusted to correspond to the same luminance as mapped for PQ'$_{La}$(Cj).

Given now the PQ'$_{La}$(Cj) values, using the original PQ curve, one can identify the codeword Ck in the input stream for which PQ(Ck)=PQ'$_{La}$(Cj). In other words:

if PQ(Ci) is mapped to PQ'$_{La}$(Cj)

then codeword Ci is mapped to codeword Ck so that
PQ(Ck)=PQ'$_{La}$(Cj). (4)

Hence, each original PQ codeword Ci, for Ci in CMin to CMax, may be mapped to its corresponding PQ codeword Ck. In other words, given input pixel $I_n$, its remapped output $I_n'$ due to ambient light adjustments will be:

if ($I_n$==Ci) then $I_n'$=Ck. (5)

In some embodiments, the input may be expressed as a normalized value in (0,1). Then if the PQ and PQ' curves are computed for B bits of precision, equation (5) can be expressed as $$\text{if } \left(I_n == \frac{Ci}{2^B - 1}\right) \text{ then } I_n' = \frac{Ck}{2^B - 1}. \quad (6)$$

The proposed mapping allows the remapped intensity data (e.g., $I_n'$) to be displayed on the target display at the adjusted luminance which is best suited for the viewing environment.

Figure 5A:
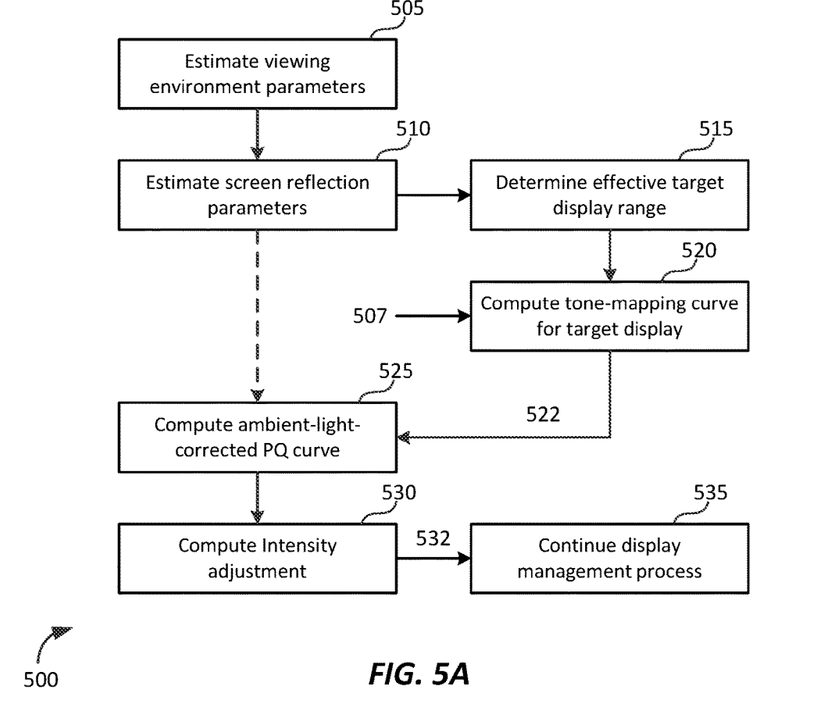
FIG. 5A and FIG. 5B depict an example process for a display management process optimized for a specific viewing environment according to embodiments of this invention.

FIG. 5A depicts an example process for performing ambient-light-corrected display management according to an embodiment. As depicted in FIG. 5A, steps 515, 520 and 535 represent the traditional display management process, for example, as discussed in the '343 publication and/or the '139 Application. The remaining steps represent additional representative steps for a display management process that can be adapted for a specific viewing environment.

The tone curve is applied only to the luminance intensity channel (I) because the ambient model predicts perception changes in the luminance domain only. An accurate prediction of these changes requires the information about the absolute luminance levels of the displayed image, so the processing should preferably be conducted in a color space that facilitates an easy conversion to linear luminance, which the RGB space does not. The method does not explicitly process chrominance, it is instead assumed that the saturation mapping step (e.g., as performed after tone-mapping) can accurately predict the change in saturation caused by the luminance change during the PQ to PQ' mapping and compensate for it.

In step 505, as described earlier (e.g., via signal 106), the process determines whether the default display management process needs to be adjusted according to user or sensor input reflecting the actual viewing environment. For example, any of the known methods in the art can be used to provide an estimate of the surrounding ambient light. Optionally, in step 510, the process may also take into consideration screen reflections. For example, a measure of screen reflections may be estimated based on a model of the screen reflectivity of the display and the viewing parameters of step 505.

A key component of display management is determining the luminance characteristics of the target display (e.g., minimum, medium or average, and maximum luminance). In some embodiments, these parameters are fixed, but in some other embodiments (e.g., with displays supporting a dynamic backlight), they may be adjusted according to the luminance characteristics of the input video and/or the viewing environment. In an embodiment, the effective range of a target display may be adjusted according to the screen reflection measure computed in step 510. For example, if the target display range is 0.005 nits to 600 nits in a dark environment, and the screen reflections are estimated at 0.1 nits, then the effective display range could be defined to be 0.105 to 600.1 nits. More generally, given an effective dynamic range for a target display (e.g., TMin and TMax), and given a measure Lr of the screen reflectivity, one may adjust the effective display range to be $$TMin'=TMin+Lr,$$

$$TMax'=TMax+Lr. \quad (7)$$

Then CMin' and CMax' may be determined so that TMin'=PQ'(CMin') and TMax'=PQ'(CMax').

In step 520, as described in the '343 publication and/or the '139 Application, the dynamic range of an input image (507) is mapped to the target display range using a tone mapping curve. This steps assumes a default PQ curve (e.g., as defined in ST 2084), computed for a nearly dark environment. Its output will be intensity samples ($I_n$) in a tone-mapped image (522).

Figure 5B:
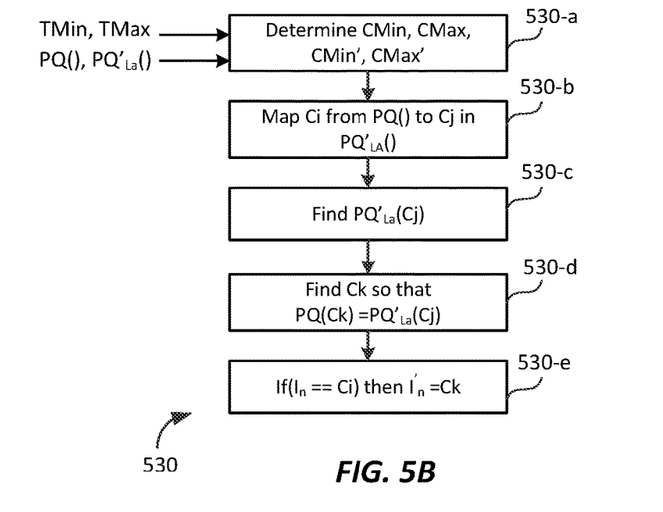

Given a measure of ambient light (La), as determined in step 505, in step 525 a new ambient-light-corrected PQ curve (PQ'$_{La}$) is computed, for example using equations (1-2). Given PQ, PQ'$_{La}$, and the output of the tone-mapping step (520), step 530 computes new intensity values $I_n$' as described in equations (3-6). These steps, as described earlier and also depicted in FIG. 5B, include:

Determine CMin, CMax, CMin', and CMax' based on (TMin, TMax) or (TMin', TMax'), and the PQ functions PQ( ) and PQ'$_{La}$( ) (Step 530-a)

Map each input codeword Ci in PQ( ) to a codeword Cj in PQ'$_{La}$( ) according to a mapping criterion, e.g., to preserve image contrast according to equation (3) (Step 530-b)

Determine PQ'$_{La}$(Cj)=B (Step 530-c)

Determine a new codeword Ck such that PQ(Ck)=PQ'$_{La}$(Cj)=B (Step 530-d)

if ($I_n$==Ci) then $I_n$'=Ck (Step 530-e)

Given the new intensity values for a corrected tone-mapped image (532), the display management process (500) may continue as described in the '343 publication and/or the '139 Application, with such steps as: saturation adjustment (where the P and T components of the input signal are suitable adjusted), color gamut mapping (210), and color transformations (215).

If screen reflectivity (Lr) was taken into consideration for the Ci to Ck codeword mapping, then in an embodiment, before displaying the image onto the target display, one should subtract the estimated screen reflectivity, otherwise the actual screen reflectivity will be added twice (first by equation (7), and second by the actual light on the display). This can be expressed as follows:

Let, (e.g., after color gamut mapping (210)), under reflective light adjustment Lr, codeword Cm to be mapped to PQ(Cm); then Find codeword Cn such that PQ(Cn)=PQ(Cm)−Lr if ($I_o$==Cm) then $I_o$'=Cn, where $I_o$ denotes the output (212) of color gamut mapping and $I_o$' the adjusted output for screen reflectivity Lr under ambient light La.

The ambient light corrected curve can be calculated using the steps described previously, or it can be calculated as a 2D LUT, with inputs being ambient light (505) and the original tone mapping curve (522). Alternately, a functional approximation of the ambient correction curve may be used, for example a cubic Hermite spline or polynomial approximation. Alternately, the parameters controlling the original curve can be modified to simultaneously perform the original tone mapping (507) and ambient corrected tone mapping (525) in a single step. In some embodiments, the ambient environment for generating the source image may also be known, in which case, one may perform a first PQ to PQ' mapping for the source image and source viewing environment, then a second PQ to PQ' mapping for the target image and target viewing environment.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to ambient-light-corrected display management processes, such as those described herein. The computer and/or IC may compute any of a variety of parameters or values that relate to ambient-light-corrected display management processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to ambient-light-corrected display management processes as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to efficient ambient-light-corrected display management processes are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for adaptive display management with a computer, the method comprising:
   receiving one or more viewing environment parameters;
   receiving an effective luminance range for a target display;
   receiving an input image comprising pixel values;
   generating a tone-mapped image by mapping with the computer intensity pixel values of the input image pixel values to intensity pixel values in the tone-mapped image, wherein generating the tone-mapped image is based on an original perceptually quantized (PQ) luminance mapping function and the effective luminance range of the display;
   generating a corrected PQ (PQ') luminance mapping function based on the one or more viewing environment parameters;
   generating a PQ-to-PQ' mapping wherein a first codeword in the original PQ luminance mapping function is mapped to a second codeword in the corrected (PQ') luminance mapping function according to the effective luminance range of the target display;
   generating an adjusted tone-mapped image by mapping intensity values in the tone-mapped image to intensity values in the adjusted tone-mapped image, wherein generating the adjusted tone-mapped image is based on the PQ-to-PQ' mapping.

2. The method of claim 1, wherein the one or more viewing environment parameters comprise an ambient light luminance value.

3. The method of claim 1, wherein the one or more viewing environment parameters comprise an estimate of light reflectivity on the target display.

4. The method of claim 1, wherein the original PQ luminance mapping function comprises a function computed according to the SMPTE ST 2084 specification.

5. The method of claim 1, wherein the effective luminance range for the target display comprises a minimum display luminance value (TMin) and a maximum display luminance value (TMax).

6. The method of claim 1, wherein generating the corrected PQ (PQ') luminance mapping function based on the one or more viewing environment parameters comprises computing $$L_{k+1} = L_k * \left( \frac{1 + 0.9 * m_t}{1 - 0.9 * m_t} \right),$$

where $L_k$ denotes the k-th step and $m_t$ denotes a detection threshold.

7. The method of claim 6, wherein $L_o$ is approximately $10^{-6}$ nits and $$m_t(L, L_a) = \frac{1}{S(L) * A(L_a)},$$

wherein $S(L)$ denotes a contrast sensitivity function and $A(L_a)$ is an ambient factor for an ambient light luminance value $L_a$.

8. The method of claim 1, wherein generating the PQ-to-PQ' mapping comprises generating a mapping preserving the relative position of the first codeword within the effective luminance range for the target display.

9. The method of claim 8, wherein preserving the relative position of the first codeword within the effective just noticeable difference (JND) range for the target display comprises mapping the first codeword (Ci) to the second codeword (Cj) using linear interpolation.

10. The method of claim 9, wherein the PQ-to-PQ' mapping comprises computing $$Cj = \left\lfloor CMax' - (CMax' - CMin') * \frac{CMax - Ci}{CMax - CMin} \right\rfloor,$$

where Ci denotes the first codewod, Cj denotes the second codeword, CMin and CMax are based on the effective luminance of the target display under the original PQ luminance mapping and CMin' and CMax' are based on the effective luminance range of the target display under the corrected PQ luminance mapping.

11. The method of claim 10, wherein CMin, CMax, CMin', and CMax', are determined so that PQ(CMin)=PQ'(CMin)=TMin and PQ(CMax)=PQ'(CMax')=TMax, wherein TMin and TMax denote respectively a minimum and a maximum display luminance value.

12. The method of claim 1, wherein generating the adjusted tone-mapped image comprises computing:

if *PQ(Ci)* is mapped to *PQ'(Cj)* according to the *PQ-to-PQ'* mapping, then codeword *Ci* is mapped to codeword *Ck* so that PQ(Ck)=PQ'(Cj);

and if $(I_n==Ci)$ then $I_n'=Ck$, where PQ(Ci) denotes the output of the original PQ luminance mapping function for the first codeword (Ci), PQ'(Cj) denotes the output of the corrected PQ mapping function for the second codeword (Cj), $I_n$ denotes an intensity pixel value in the tone-mapped image, and $I_n'$ denotes a corresponding intensity pixel value in the adjusted tone-mapped image.

13. An apparatus comprising a processor and configured to perform the method recited in claim 1.

14. A non-transitory computer-readable storage medium having stored thereon computer-executable instruction for executing a method with one or more processors in accordance with claim 1.

\* \* \* \* \*